(12) United States Patent
Lee et al.

(10) Patent No.: US 12,362,485 B2
(45) Date of Patent: Jul. 15, 2025

(54) ELECTRONIC DEVICE COMPRISING PATCH ANTENNA AND COIL ANTENNA

(71) Applicant: SAMSUNG ELECTRONICS CO., LTD., Suwon-si (KR)

(72) Inventors: Woosup Lee, Suwon-si (KR); Seho Park, Suwon-si (KR); Soon Park, Suwon-si (KR); Jungoh Sung, Suwon-si (KR); Haekwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 18/121,906

(22) Filed: Mar. 15, 2023

(65) Prior Publication Data

US 2023/0223693 A1    Jul. 13, 2023

Related U.S. Application Data

(63) Continuation of application No. PCT/KR2021/011603, filed on Aug. 30, 2021.

(30) Foreign Application Priority Data

Sep. 16, 2020   (KR) .................. 10-2020-0118847

(51) Int. Cl.
*H01Q 1/38*   (2006.01)
*H01Q 1/24*   (2006.01)
(Continued)

(52) U.S. Cl.
CPC ........... *H01Q 9/0407* (2013.01); *H01Q 1/243* (2013.01); *H01Q 5/25* (2015.01); *H01Q 7/00* (2013.01)

(58) Field of Classification Search
CPC ............ H01Q 1/24; H01Q 1/243; H01Q 1/38; H01Q 5/25; H01Q 9/0407; H01Q 7/00;
(Continued)

(56) References Cited

U.S. PATENT DOCUMENTS 9,152,911 B2   10/2015   Jain et al.
9,418,362 B2    8/2016   Jain et al.
(Continued)

FOREIGN PATENT DOCUMENTS

JP    2007-6465      1/2007
JP    2010-87541     4/2010
(Continued)

OTHER PUBLICATIONS

International Search Report for PCT/KR2021/011603 mailed Dec. 15, 2021, 5 pages.
(Continued)

*Primary Examiner* — Thai Pham
(74) *Attorney, Agent, or Firm* — Nixon & Vanderhye P.C.

(57) ABSTRACT

An electronic device, according to various embodiments of the present disclosure, may comprise: a first layer including a first antenna having a patch shape, and a second antenna at least partially surrounding the first antenna and having a coil shape; a second layer including a first pattern disposed at a position corresponding to the first antenna and configured to operate as a ground of the first antenna, and a second pattern electrically connected to the second antenna; a dielectric disposed between the first layer and the second layer; and a magnetic material disposed under the dielectric at a position corresponding to the second antenna.

16 Claims, 12 Drawing Sheets

(51) Int. Cl.
*H01Q 5/25* (2015.01)
*H01Q 7/00* (2006.01)
*H01Q 9/04* (2006.01)
*H04B 5/26* (2024.01)

(58) Field of Classification Search
CPC .......... H01Q 21/28; H04B 5/26; H04B 5/263; H04B 5/43; H04B 5/79
See application file for complete search history.

(56) References Cited

U.S. PATENT DOCUMENTS

| | | | |
|---|---|---|---|
| 10,965,157 B2 | 3/2021 | Lee et al. | |
| 11,251,655 B2 | 2/2022 | Cho et al. | |
| 11,462,846 B2 | 10/2022 | Seo et al. | |
| 11,881,722 B2 | 1/2024 | Park | |
| 2005/0104789 A1* | 5/2005 | Hashidate | H01Q 5/40 343/866 |
| 2007/0046544 A1 | 3/2007 | Murofushi et al. | |
| 2007/0273600 A1 | 11/2007 | Tsujimura et al. | |
| 2010/0081376 A1 | 4/2010 | Emura | |
| 2014/0176382 A1* | 6/2014 | Nakano | G06K 7/10178 343/788 |
| 2014/0184462 A1* | 7/2014 | Yosui | H01Q 7/06 343/788 |
| 2016/0210616 A1 | 7/2016 | Lee et al. | |
| 2017/0063132 A1* | 3/2017 | Sultenfuss | H02J 50/70 |
| 2019/0140699 A1 | 5/2019 | Park et al. | |
| 2019/0363584 A1 | 11/2019 | Leem | |
| 2020/0036083 A1 | 1/2020 | Kim et al. | |
| 2023/0110427 A1* | 4/2023 | Lee | H01Q 25/002 343/725 |

FOREIGN PATENT DOCUMENTS

| | | |
|---|---|---|
| JP | 2011-135307 | 7/2011 |
| JP | 6437375 | 12/2018 |
| KR | 10-2005-0013970 | 2/2005 |
| KR | 2016-0093127 | 8/2016 |
| KR | 10-2018-0064740 | 6/2018 |
| KR | 10-2019-0060180 | 6/2019 |
| KR | 10-2020-0012106 | 2/2020 |
| KR | 10-2020-0014126 | 2/2020 |
| KR | 10-2020-0042313 A | 4/2020 |
| KR | 10-2020-0045661 A | 5/2020 |
| KR | 10-2020-0101096 A | 8/2020 |
| WO | 2020/145197 | 7/2020 |

OTHER PUBLICATIONS

Written Opinion of the ISA for PCT/KR2021/011603 mailed Dec. 15, 2021, 4 pages.
Extended European Search Report dated Jan. 4, 2024 issued in European Patent Application No. 21869586.4.
Korean Office Action issued Jan. 30, 2024 in corresponding Korean Patent Application No. 10-2020-0118847.
Korean Notice of Patent Grant dated Oct. 18, 2024 for KR Application No. 10-2020-0118847.

* cited by examiner

ELECTRONIC DEVICE COMPRISING PATCH ANTENNA AND COIL ANTENNA

CROSS-REFERENCE TO RELATED APPLICATIONS

This application is a continuation of International Application No. PCT/KR2021/011603 designating the United States, filed on Aug. 30, 2021, in the Korean Intellectual Property Receiving Office and claiming priority to Korean Patent Application No. 10-2020-0118847, filed on Sep. 16, 2020, the disclosures of which are incorporated by reference herein in their entireties.

BACKGROUND

Field

The disclosure relates to an electronic device including a patch antenna and a coil antenna.

Description of Related Art

Recently released electronic devices support a technology for transmitting power or data in a magnetic induction method using a coil in order to provide various services to users. For example, the electronic devices may wirelessly transmit or receive power according to wireless charging standards defined by the Wireless Power Consortium (WPC), the Alliance for Wireless Power (A4WP), and the like and may transmit data using magnetic secure transfer (MST), near-field communication (NFC), and the like.

In particular, in order to transmit power and/or data, the electronic devices generally include a plurality of coils provided on a flexible printed circuit board (FPCB) and optimized for wireless charging, MST, and NFC technologies.

In addition, recent electronic devices may include ultra-wide band (UWB) antennas for positioning and/or broad-band communication of the electronic devices. UWB antennas usually perform communication in a high frequency band of 6 to 9 GHz, so patch-type antennas are adopted.

Recently released mobile terminals are equipped with various technologies such as UWB, WPC, MST, and NFC, and to support these technologies, it is necessary to implement patches and respective coil patterns in the electronic devices. However, due to the limitation in the mounting space in a mobile terminal, all or some of patches or coils for wireless communication may overlap each other. Since all of these coils are formed of conductors, interference occurs therebetween, and a radiator used for obtaining desired efficiency or a magnetic material or a dielectric material used with the radiator despite such interference is relatively expensive.

In addition, the sizes of respective patterns may be reduced to prevent and/or reduce overlapping between the patterns, and some performance degradation may occur due to the use of a magnetic material that satisfies all characteristics of disposed coil patterns.

In particular, in order for UWB to effectively perform a positioning function, at least three patches arranged horizontally and vertically are required. For positioning, it is required that the interval between the patches corresponds to ½ wavelength of a target wavelength. Therefore, since UWB antenna modules and coil antenna modules require a very wide mounting space from the viewpoint of a mobile terminal, a mounting method for minimizing overlap therebetween is required.

SUMMARY

An electronic device according to various example embodiments of the disclosure may include: a first layer including a first antenna having a patch shape, and a second antenna surrounding the first antenna and having a coil shape, a second layer including a first pattern disposed at a position corresponding to the first antenna and configured to operate as a ground of the first antenna, and a second pattern electrically connected to the second antenna, a dielectric material disposed between the first layer and the second layer, and a magnetic material disposed under the dielectric at a position corresponding to the second antenna.

An electronic device according to various example embodiments of the disclosure may include: a housing including an accommodation space in which electronic components are disposed, wherein the housing includes a first accommodation space, a first coil antenna disposed in an area other than the first accommodation space inside the housing, and an antenna module comprising at least one antenna disposed in the first accommodation space. The antenna module may include a first layer including a first antenna having a patch shape, and a second antenna surrounding the first antenna and having a coil shape, a second layer including a first pattern disposed at a position corresponding to the first antenna and configured to operate as a ground of the first antenna, and a second pattern electrically connected to the second antenna, a dielectric material disposed between the first layer and the second layer, and a magnetic material disposed under the dielectric at a position corresponding to the second antenna.

According to various example embodiments of the disclosure, it is possible to implement a wireless charging coil using a wire-type coil in an electronic device including a wireless charging function. In addition, for various pattern antennas, it is possible to improve the performance of the antenna using a magnetic material suitable for each characteristic.

According to various example embodiments of the disclosure, it is possible to secure a degree of freedom in designing an antenna pattern.

The effects that can be obtained by various embodiments disclosed herein are not limited to those described above, and other effects, which are not described above, may be clearly understood by a person ordinarily skilled in the technical field to which the disclosure belongs.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
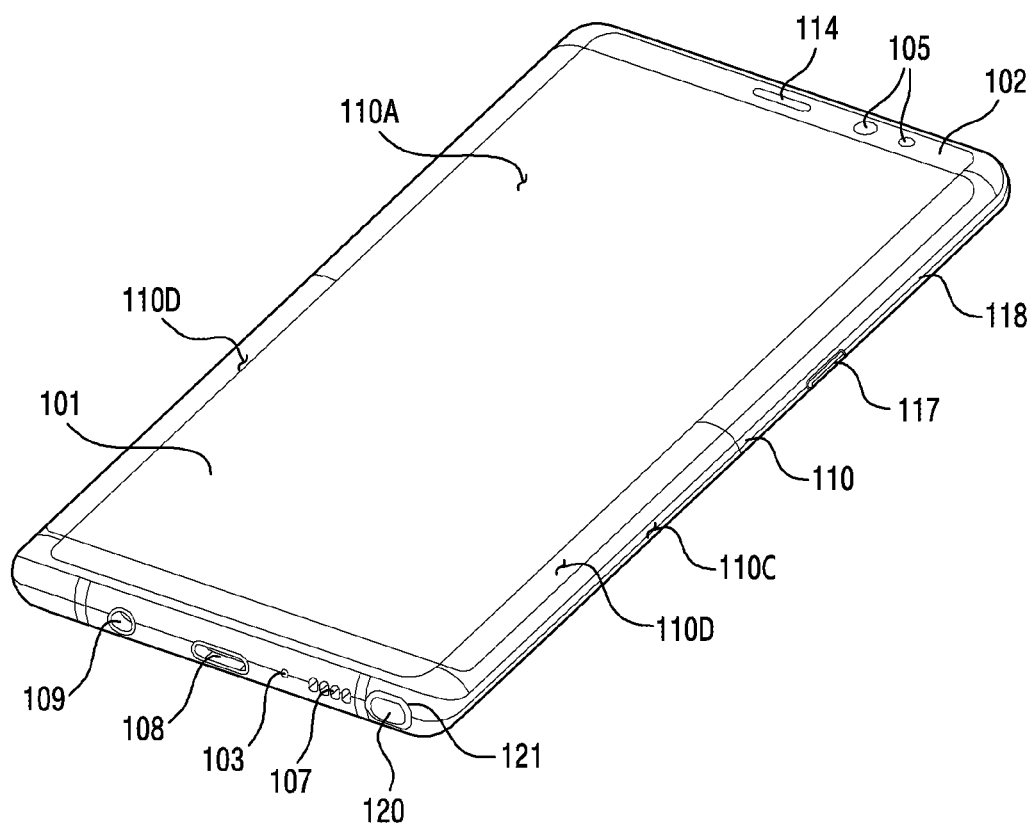
FIG. 1A is a front perspective view of a mobile electronic device according to various embodiments.
Figure 1B:
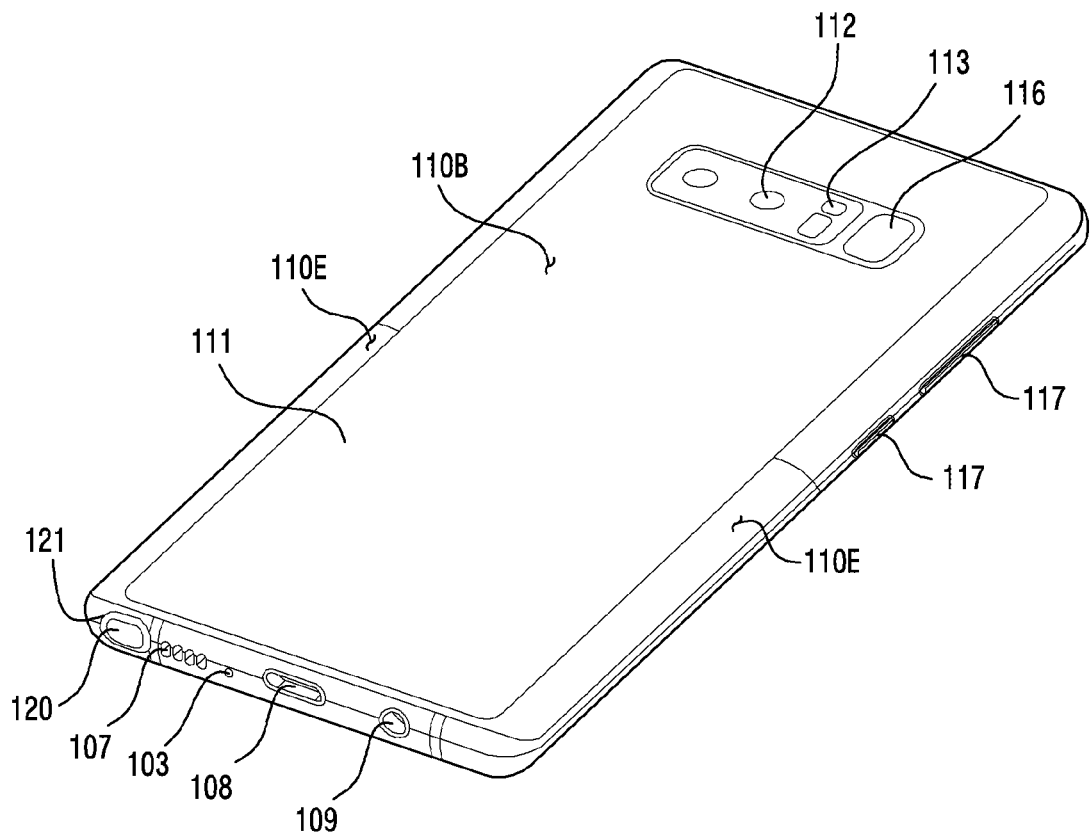
FIG. 1B is a rear perspective view illustrating the rear surface of the electronic device according to various embodiments.

FIG. 1A is a front perspective view of a mobile electronic device according to various embodiments. FIG. 1B is a rear perspective view illustrating the rear surface of the electronic device according to various embodiments.

Referring to FIGS. 1A and 1B, an electronic device 100 according to an embodiment may include a housing 110 including a first surface (or a front surface) 110A, a second surface (or a rear surface) 110B, and a side surface 110C surrounding a space between the first surface 110A and the second surface 110B. In an embodiment (not illustrated), the term "housing" may refer to a structure defining some of the first surface 110A, the second surface 110B, and the side surface 110C in FIG. 1A. According to an embodiment, at least a portion of the first surface 110A may be configured with a substantially transparent front surface plate 102 (e.g., a glass plate or a polymer plate including various coating layers). The second surface 110B may be configured with a substantially opaque rear surface plate 111. The rear surface plate 111 may be made of, for example, coated or colored glass, ceramic, polymer, metal (e.g., aluminum, stainless steel (STS), or magnesium), or a combination of two or more of these materials. The side surface 110C may be configured with a side surface bezel structure (or a "side surface member") 118 coupled to the front surface plate 102 and the rear surface plate 111 and including metal and/or polymer. In various embodiments, the rear surface plate 111 and the side surface bezel structure 118 may be integrally configured and may include the same material (e.g., a metal material such as aluminum).

In the illustrated embodiment, the front surface plate 102 may include, at the long opposite side edges thereof, two first areas 110D, which are bent from the first surface 110A toward the rear surface plate 111 and extend seamlessly. In the illustrated embodiment (see FIG. 1B), the rear surface plate 111 may include, at the long opposite side edges thereof, two second areas 110E, which are bent from the second surface 110B toward the front surface plate 102 and extend seamlessly. In various embodiments, the front surface plate 102 (or the rear surface plate 111) may include only one of the first areas 110D (or the second areas 110E).

In an embodiment, some of the first areas 110D or the second areas 110E may not be included. In the above-described embodiments, in the side surface of the electronic device 100, the side surface bezel structure 118 may have a first thickness (or width) on the side where the first areas 110D or the second areas 110E are not included, and may have a second thickness, which is thinner than the first thickness, on the side where the first areas 110D or the second areas 110E are included.

According to an embodiment, the electronic device 100 may include one or more of a display 101, audio modules 103, 107, and 114, camera modules 105, 112, and 113, key input devices 117, and connector holes 108 and 109. In various embodiments, in the electronic device 100, at least one of the components (e.g., the key input devices 117) may be omitted, or other components may be additionally included.

The display 101 may be visible through, for example, a substantial portion of the front surface plate 102. In various embodiments, at least a portion of the display 101 may be visible through the front surface plate 102 providing the first surface 110A and the first areas 110D of the side surface 110C. In various embodiments, the edges of the display 101 may be configured to be substantially the same as the shape of the periphery of the front surface plate 102 adjacent thereto. In an embodiment (not illustrated), the distance between the periphery of the display 101 and the periphery of the front surface plate 102 may be substantially constant in order to enlarge the visible area of the display 101.

In an embodiment (not illustrated), a recess or an opening may be provided in a portion of a screen display area of the display 101, and at least one of a sensor module 104 and a camera module 105, which are aligned with the recess or the opening, may be included. In an embodiment (not illustrated), the rear surface of the screen display area of the display 101 may include at least one of an audio module 114, a camera module 105, and a fingerprint sensor 116. In an embodiment (not illustrated), the display 101 may be coupled to or disposed adjacent to a touch-sensitive circuit, a pressure sensor capable of measuring a touch intensity (pressure), and/or a digitizer configured to detect an electromagnetic field-type stylus pen.

The audio modules 103, 107, and 114 may include a microphone hole 103 and speaker holes 107 and 114. The microphone hole 103 may include a microphone disposed therein to acquire external sound, and in various embodiments, a plurality of microphones may be disposed therein to be able to detect the direction of sound. The speaker holes 107 and 114 may include an external speaker hole 107 and a call receiver hole 114. In various embodiments, while implementing the speaker holes 107 and 114 and the microphone hole 103 as a single hole, or without the speaker holes 107 and 114, a speaker (e.g., a piezo speaker) may be included.

The camera modules 105, 112, and 113 may include a first camera device 105 disposed on the first surface 110A of the electronic device 100, and a second camera device 112 and/or a flash 113 disposed on the second surface 110B of the electronic device 100. The camera devices 105 and 112 may include one or more lenses, an image sensor, and/or an image signal processor. The flash 113 may include, for example, a light-emitting diode or a xenon lamp. In various embodiments, two or more lenses (e.g., an infrared camera lens, a wide-angle lens, and a telephoto lens) and image sensors may be disposed on one surface of the electronic device 100.

The key input devices 117 may be disposed on the side surface 110C of the housing 110. In an embodiment, the electronic device 100 may not include some or all of the above-mentioned key input devices 117, and a key input devices 117, which is not included, may be implemented in another form, such as a soft key, on the display 101. In various embodiments, the key input devices may include a sensor module 116 disposed on the second surface 110B of the housing 110.

The connector holes 108 and 109 may include a first connector hole 108, which is capable of accommodating a connector (e.g., a USB connector) for transmitting/receiving power and/or data to/from an external electronic device, and/or a second connector hole (e.g., an earphone jack) 109, which is capable of accommodating a connector for transmitting/receiving an audio signal to/from an external electronic device.

The pen input device 120 (e.g., a stylus pen) may be guided to be inserted into or detached from the inside of the housing 110 through a hole 121 provided in the side surface of the housing 110 and may include a button for facilitating the detachment. The pen input device 120 may include a separate resonance circuit therein to be interlocked with an electromagnetic induction panel 390 (e.g., a digitizer) included in the electronic device 100. The pen input device 120 may include an electromagnetic resonance (EMR) scheme, an active electrical stylus (AES) scheme, and an electric coupled resonance (ECR) scheme.

Figure 2:
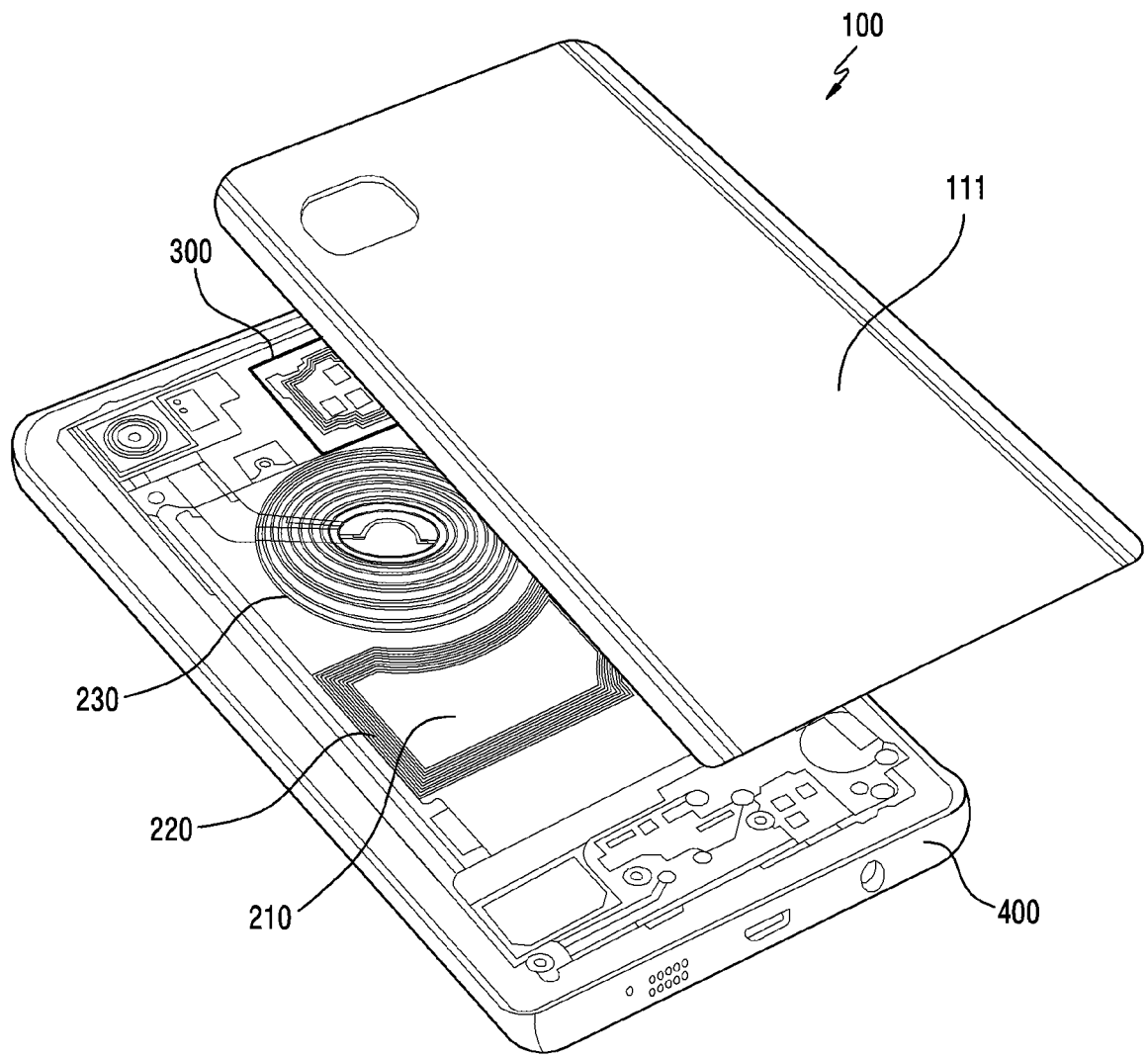
FIG. 2 is an exploded perspective view illustrating a state in which coils supporting a wireless communication technology are mounted in an electronic device according to various embodiments

FIG. 2 is an exploded perspective view illustrating a state in which coils supporting a wireless communication technology are mounted in an electronic device according to various embodiments.

Referring to FIG. 2, an electronic device 100 according to various embodiments may include a housing 400, which defines the side surface of the electronic device 100, a front surface plate (not illustrated), which defines the front surface of the electronic device 100 and at least a portion of which is substantially transparent, and a rear surface plate 111, which defines the rear surface of the electronic device 100.

According to an embodiment, an inner space may be provided inside the housing 400 by the front plate and the rear surface plate 111, and coils that support a wireless communication technology may be mounted adjacent to the rear surface plate 111 in the inner space.

In an example, the electronic device 100 may include a flexible printed circuit board (FPCB) 210, a first coil 220, and a second coil 230 disposed in the inner space.

According to an embodiment, the first coil 220 may be electrically connected to the FPCB 210. According to an embodiment, the first coil 220 and the second coil 230 may be spaced apart from each other, but the disclosure is not limited thereto. For example, the first coil 220 and the second coil 230 may be disposed to overlap each other in some areas. According to an embodiment, the first coil 220 and the second coil 230 may be disposed to be deviated from each other such that the centers thereof do not coincide with each other.

According to an embodiment, when viewing the electronic device 100 from the rear surface, an antenna module (e.g., including at least one antenna) 300 may be disposed in an area distinguished from the coils supporting the wireless communication technology.

Figure 3:
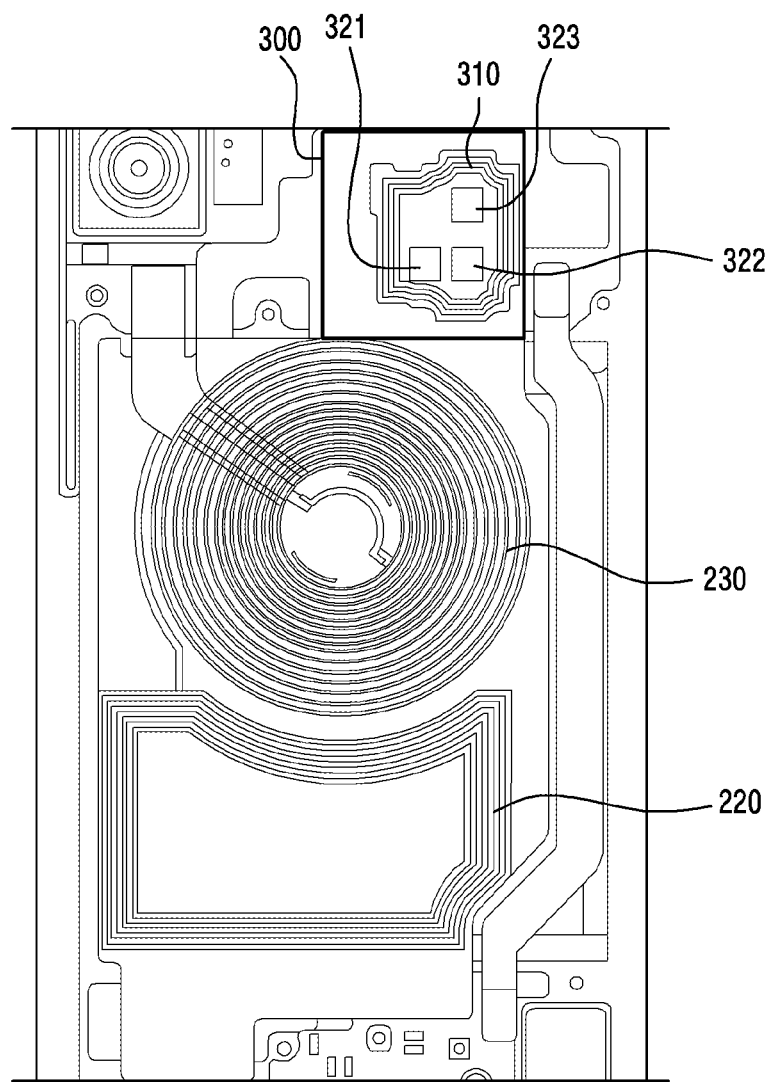
FIG. 3 is a diagram illustrating an electronic device including an antenna module and a coil antenna according to various embodiments.

FIG. 3 is a diagram illustrating an electronic device including an antenna module and a coil antenna according to various embodiments.

Referring to FIG. 3, an electronic device 100 according to an embodiment may include an antenna module 300, a first coil 220, and a second coil 230. According to an embodiment, the first coil 220 and the second coil 230 may be implemented on a flexible printed circuit board (FPCB) (e.g., 210 in FIG. 2). However, in an embodiment, one of the first coil 220 and the second coil 230 may be omitted. The number and arrangement of coils illustrated in FIG. 3 are examples, and in various embodiments, coils for performing one of an MST function, an NFC function, or a WPC function in an area that does not overlap the antenna module 300 are provided in an appropriate form.

According to an embodiment, the first coil 220 may be used as a coil for magnetic secure transfer (MST). In the disclosure, the MST technology may refer to a technology that generates a magnetic field such that a card reader recognizes it as swiping a magnetic card. In the MST communication technology, the communication performance may be proportional to the strength of the magnetic field that can be generated by an MST coil. According to various embodiments of the disclosure, the first coil 220 may be made of a wire including a plurality of strands and may be disposed in a different area from a wireless charging coil (e.g., the second coil 230) such that the center of the first coil does not coincide with that of the wireless charging coil. As described above, as the first coil 220 is disposed in a different area from the wireless charging coil, the first coil 220 according to an embodiment may be coupled to a magnetic material having high magnetic permeability.

According to an embodiment, the second coil 230 may be used as a wireless charging coil (e.g., a wireless power coil (WPC)) for wireless charging. The second coil 230 may have a spiral shape. The electronic device 100 according to an embodiment may wirelessly receive power from an external electronic device (not illustrated) via the second coil 230. In addition, in an embodiment, the electronic device 100 may wirelessly supply power to other electronic devices (e.g., smart phones, smart watches, earphones, etc.) via the second coil 230. The electronic device 100 may support one or more of various wireless charging schemes including, for example, an electromagnetic resonance scheme or an electromagnetic induction scheme using the second coil 230. The second coil 230 according to an embodiment may be implemented as a wire.

The antenna module 300 according to an embodiment may include a first antenna 310 and second antennas 320. According to an embodiment, the second antennas 320 may include at least one patch antenna 321, 322 or 323.

According to an embodiment, the first antenna 310 may be an NFC antenna for short-range wireless communication. For example, the first antenna 310 may include a coil wound in a loop shape.

According to an embodiment, the first antenna 310 and the second antennas 320 may be arranged not to overlap each other. For example, the first antenna 310 may be disposed to surround the second antennas 320, but the disclosure is not limited thereto. For example, some of the second antennas 320 (e.g., 321 and 322) are disposed inside the area surrounded by the first antenna 310, and the remainder (e.g., 323) may be disposed outside the area surrounded by the first antenna 310.

In addition, although FIG. 3 illustrates that the antenna module 300 is relatively smaller than the first coil 220 or the second coil 230 in FIG. 3, this should not be interpreted as limiting the relative size of the antenna module 300. The antenna module 300 may have an appropriate size depending on the transmission frequency of a target UWB or coil antenna. The antenna module 300 according to an embodiment may be disposed in an area on the right of the camera.

The antenna module 300 according to an embodiment may be disposed not to overlap the first coil 220 and the second coil 230. The antenna module 300, the first coil 220, and the second coil 230 according to an embodiment may be electrically connected via a printed circuit board (PCB) (not illustrated). Since the antenna module 300 is disposed not to overlap other coils, interference of each antenna may be reduced and performance may be improved. The first antenna 310, the second antenna 320, the first coil 220, and the second coil 230 according to an embodiment may be implemented on one flexible printed circuit board (FPCB) (e.g., 210 in FIG. 2). According to an embodiment, a first flexible printed circuit board (FPCB) on which the first antenna 310 and the second antenna 320 are implemented may be electrically connected to the connector via a first pin. A second flexible printed circuit board (FPCB) on which the first coil 220 and the second coil 230 are implemented may be electrically connected to the connector via a second pin. The first FPCB and the second FPCB may be electrically connected to a communication circuit in a printed circuit board (PCB) via a connector. As another example, the first FPCB may be electrically connected to the PCB via a first connector, and the second FPCB may be electrically connected to the PCB via a second connector.

Figure 4:
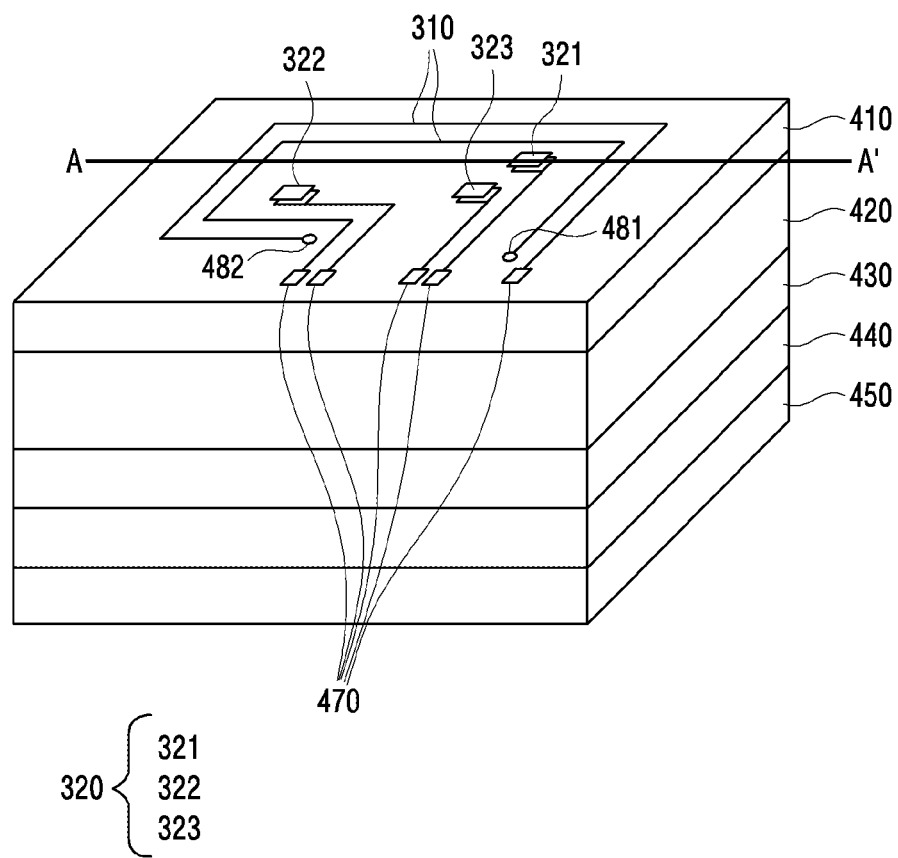
FIG. 4 is a perspective view of an antenna module including a first antenna and a second antenna according to various embodiments.

FIG. 4 is a perspective view of an antenna module including a first antenna and a second antenna according to various embodiments.

Referring to FIG. 4, the antenna module 300 according to an embodiment may have a stacked structure including a plurality of layers. The antenna module 300 may include a first layer 410, a second layer 430, a dielectric 420, a magnetic material 440, and a heat dissipation sheet 450. The stacked structure of FIG. 4 is merely an example and may be appropriately modified. For example, the heat dissipation sheet 450 may be omitted or replaced with another structure.

The first antenna 310 and the second antenna 320 according to an embodiment may include a plurality of terminals 470 to be connected to a printed circuit board (PCB) (not illustrated). The plurality of terminals 470 may be collectively arranged in one area of the stacked structure to provide a socket to which a connector is coupled. A socket provided on the antenna module 300 and the socket provided on the PCB may be connected to each other via a connector (e.g., an FPCB connector).

According to an embodiment, the first antenna 310 may include a first point 481 and a second point 482 as connection points for forming a coil shape. A detailed description of the connection via the first point 481 and the second point 482 will be described below.

The first antenna 310 and the second antenna 320 according to an embodiment may be included in the first layer 410. For example, the first antenna 310 and the second antenna 320 may be included in the first layer 410 and disposed on the dielectric 420. The electronic device 100 according to an embodiment may include a second layer 430 including a ground for the second antenna 320. According to an embodiment, a dielectric material 420 having a predetermined (e.g., specified) permittivity may be disposed between the first layer 410 and the second layer 430.

The magnetic material 440 according to an embodiment may include a ferrite sheet capable of improving the performance of the first antenna 310, which may be an NFC antenna. The magnetic material 440 according to an embodiment may be disposed below the second layer 430. According to an embodiment, the magnetic material 440 may surround the second layer 430 and may be disposed in an area corresponding to the first antenna 310. A detailed description of this will be described below.

The heat dissipation sheet 450 (e.g., a graphite sheet) according to an embodiment may be disposed on the bottom surface of the magnetic material 440. The heat dissipation sheet 450 according to an embodiment may be disposed between the second layer 430 and the magnetic body 440. The heat dissipation sheet 450 uniformly spreads the heat generated from the antenna module 300 over the entire surface to prevent and/or reduce heat concentration. The heat dissipation sheet 450 according to an embodiment may include a thin metal tape having high thermal conductivity.

Figure 5:
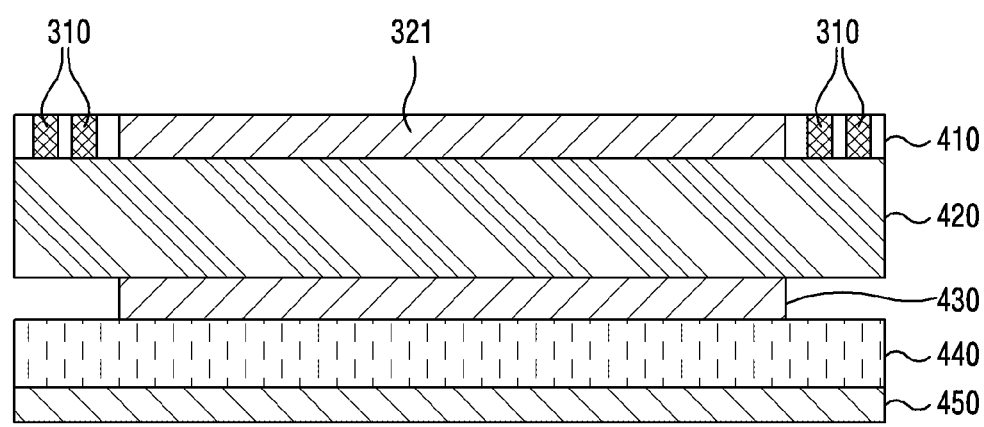
FIG. 5 is a cross-sectional view of an antenna module according to various embodiments.

FIG. 5 is a cross-sectional view of an antenna module according to various embodiments.

Referring to FIGS. 4 and 5 together, FIG. 5 is a cross-sectional view of a portion corresponding to A-A' in FIG. 4. The antenna module 300 according to an embodiment may include a first layer 410 including a first antenna patch 321 and a first antenna 310, a dielectric material 420, a second layer 430, a magnetic material 440, and a heat dissipation sheet 450. The same reference numerals are used for the same or substantially the same components as those described above, and redundant descriptions will be omitted.

The first layer 410 according to an embodiment may be disposed on the dielectric material 420. The second layer 430 according to an embodiment may be disposed at a position corresponding to the first antenna patch 321 with the first layer 410 and the dielectric material 420 interposed therebetween. According to an embodiment, an area corresponding to the first antenna 310 of the first layer 410 in the second layer 430 may, for example, be fill cut. For example, an area corresponding to the first antenna 310 may not include a ground. The second layer 430 according to an embodiment may include a first pattern capable of operating as a ground for the first antenna patch 321. In addition, the second layer 430 may include a second pattern that may operate as a part of the pattern of the first antenna 310. A detailed description of this will be described later.

The dielectric material 420 according to an embodiment may include a material having a low dielectric constant (Dk). The dielectric material 420 according to an embodiment may include a material having a low dielectric dissipation factor (DF).

Figure 6:
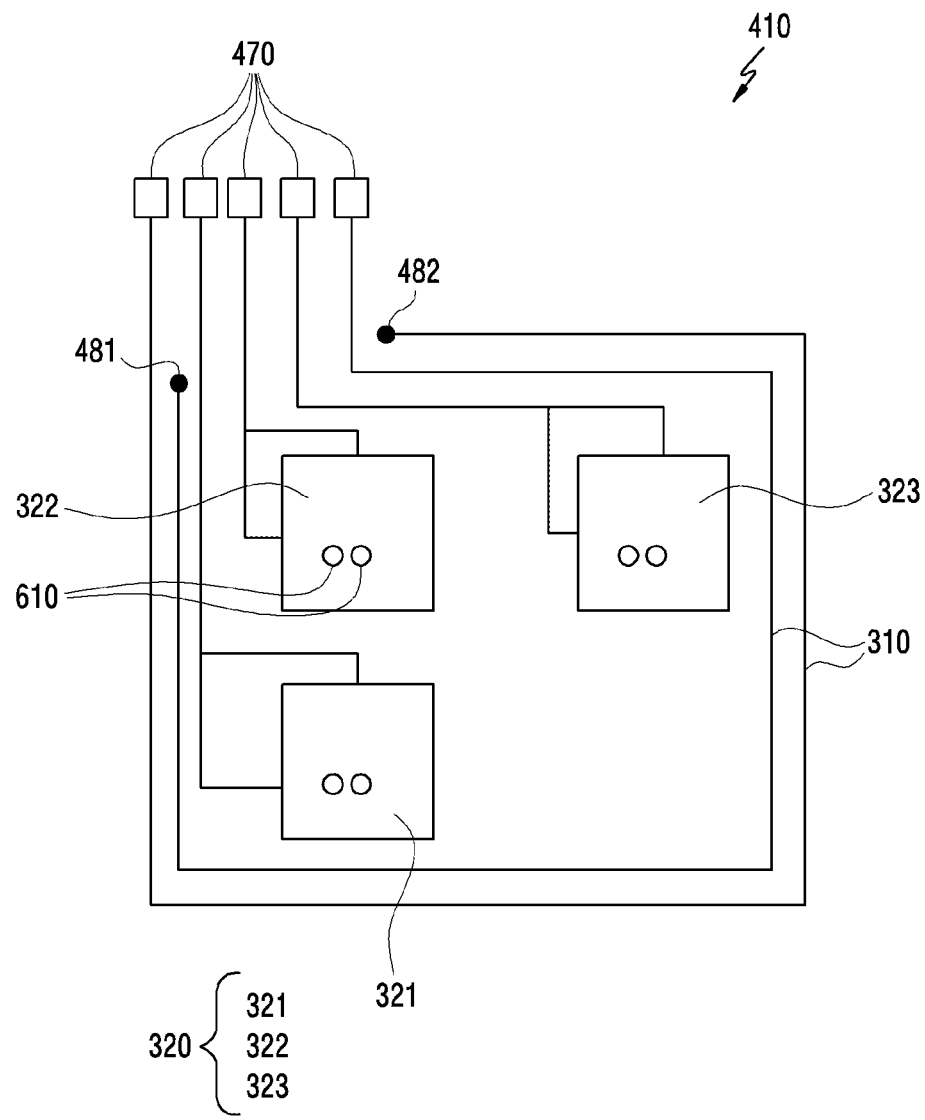
FIG. 6 is a diagram illustrating a first layer of an antenna module according to various embodiments.

FIG. 6 is a diagram illustrating a first layer of an antenna module according to various embodiments.

Referring to FIG. 6, the first layer 410 includes a first antenna 310 including a first point 481 and a second point 482, a second antenna 320, a conductive via 610, and a plurality of terminals 470.

According to an embodiment, the second antennas 320 may include at least one patch antenna 321, 322 or 323. The at least one patch antenna 321, 322, or 323 according to an embodiment may be used to transmit/receive an ultra-wide band (e.g., UWB) signal. For example, the ultra-wide band may be a frequency band of about 3.1 GHz to about 10.6 GHz but is not limited thereto. In addition, respective patch antenna may be disposed at an interval of about half a wavelength from each other and may be arranged in a right triangle or a shape close to a right triangle. However, the disclosure is not limited thereto.

According to an embodiment, the first antenna 310 may be disposed to be spaced apart from the second antenna 320. The first antenna 310 according to an embodiment may be arranged to substantially or at least partially surround the second antenna 320, but the disclosure is not limited thereto. According to an embodiment, each patch antenna 321, 322, or 323 may be oriented perpendicular to each other. The first antenna 310 according to an embodiment may include at least one conductive pattern surrounding the second antenna 320. The first antenna 310 according to an embodiment may be a coil antenna for near-field communication (NFC), but the disclosure is not limited thereto. For example, the first antenna 310 may transmit/receive signals using a frequency band of about 13.56 MHz.

The second antenna 320 according to an embodiment may include at least one conductive via 610 for connection to a ground of the second layer 430. The first antenna 310 according to an embodiment may include a first point 481 and a second point 482 connected via the second layer 430 to form a coil shape. A detailed description of the connection of the first point 481 and the second point 482 via the second layer 430 will be described below.

According to an embodiment, the first antenna 310 and the second antenna 320 may be connected to a plurality of terminals 470 to be connected to a printed circuit board (not illustrated). The second antenna 320 according to an embodiment may be connected to at least some of the plurality of terminals 470 via at least one conductive line. For example, at least one conductive line may be a microstrip, but the disclosure is not limited thereto.

Figure 7:
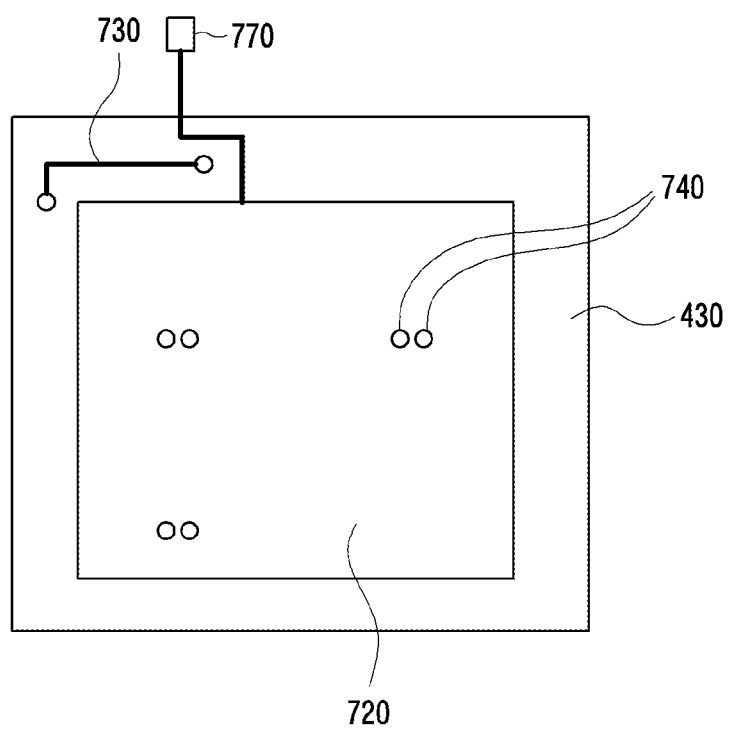
FIG. 7 is a diagram illustrating a second layer and a magnetic body of an antenna module according to various embodiments.

FIG. 7 is a diagram illustrating a second layer and a magnetic material of an antenna module according to various embodiments.

Referring to FIGS. 4 and 7 together, the second layer 430 may include a first pattern 720 and a second pattern 730. According to an embodiment, the first pattern 720 and the second pattern 730 may be spaced apart from each other. The first pattern 720 according to an embodiment may operate as a ground for the second antenna 320 included in the first layer 410. According to an embodiment, the second pattern 730 may be connected to the first point 481 and the second point 482 of the first antenna 310 on the first layer 410 through vias.

According to an embodiment, the first pattern 720 may be connected to the second antenna 320 of the first layer 410 via at least one conductive via 740. For example, the first pattern 720 may be connected to the second antenna 320 of the first layer 410 via at least one conductive via 740 and may operate as a ground for the second antenna 320. According to an embodiment, the first pattern 720 may be connected to a terminal 770 to be connected to a printed circuit board (not illustrated). For example, the first pattern 720 may be connected to the terminal 770 by a micro strip, but the disclosure is not limited thereto. In an embodiment, the terminal 770 may be disposed together with the plurality of terminals 470 of the first layer and may be connected to a ground of the PCB through a connector.

According to an embodiment, the second pattern 730 may be connected to the first antenna 310 to complete a coil shape. The second pattern 730 according to an embodiment may include a conductive via to be connected to the first antenna 310. The first point 481 and the second point 482 of the first antenna 310 may be connected via the second pattern 730.

According to an embodiment, the magnetic material 440 may be disposed below the second layer 430. The magnetic material 440 according to an embodiment may include a ferrite sheet capable of improving the performance of the first antenna 310.

According to an embodiment, the second layer 430 may have a size equal to or smaller than that of the magnetic body 440.

Figure 8:
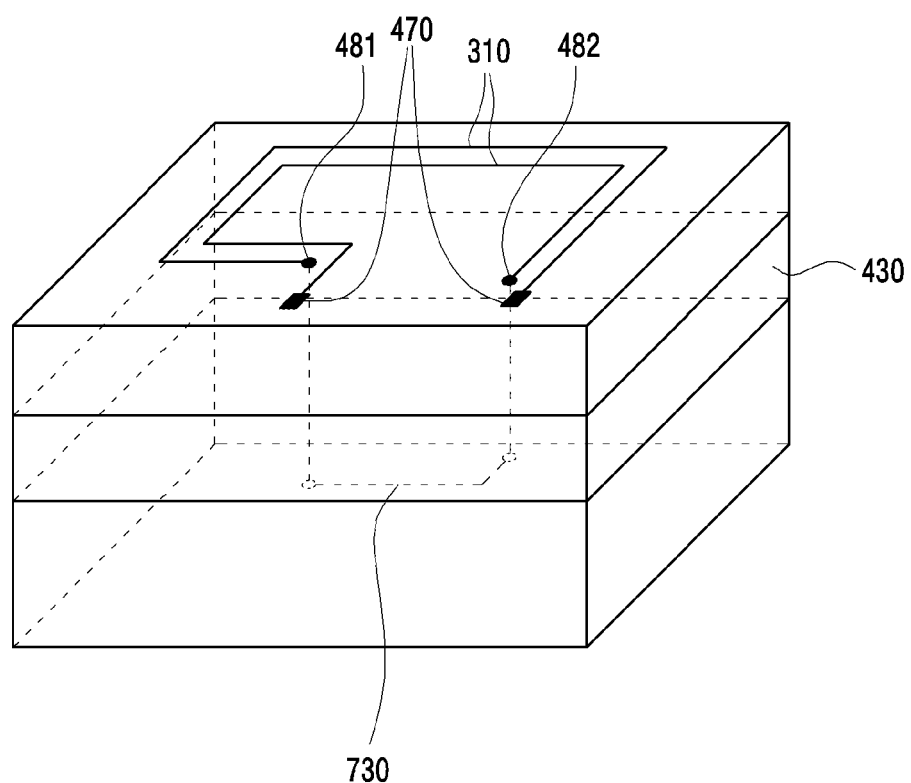
FIG. 8 is a perspective view illustrating a coupling relationship between a first antenna and a second pattern according to various embodiments.

FIG. 8 is a perspective view illustrating a coupling relationship between a first antenna and a second pattern according to various embodiments.

Referring to FIG. 8, an antenna module 300 according to an embodiment may include a first antenna 310 and a second pattern 730. The same reference numerals are used for components that are identical to or substantially the same as those described above, and some components (e.g., the second antenna 320) may be omitted for convenience of description.

Referring to FIGS. 7 and 8 together, the first antenna 310 included in the first layer 410 according to an embodiment may be electrically connected to the second pattern 730 on the second layer 430. The second pattern 730 according to an embodiment may be electrically connected to the first point 481 and the second point 482 of the first antenna 310. According to an embodiment, the first antenna 310 may be connected to the second pattern 730 to form a coil shape. The first antenna 310 according to an embodiment may be connected to the second pattern 730 to provide a coil having at least one number of rotations. For example, a coil provided by connecting the first antenna 310 and the second pattern 730 may be disposed to surround the center of the antenna module 300 twice. In various embodiments, a coil pattern having three or more windings may be implemented via a plurality of conductive patterns and a plurality of vias provided on the second layer 430.

According to an embodiment, the first antenna 310 may be connected to at least one terminal 470 to be connected to a printed circuit board (not illustrated).

Referring to FIGS. 4 and 8 together, the first antenna 310 and the second pattern 730 may pass through the dielectric material 420 disposed between the first layer 410 and the second layer 430 to be connected to each other.

Figure 9:
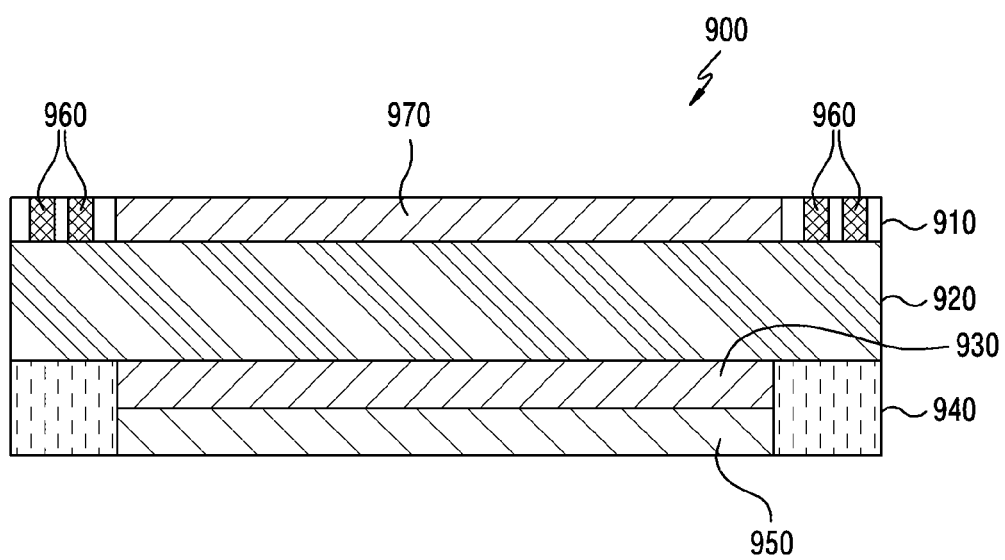
FIG. 9 is a cross-sectional view of an antenna module in which a magnetic material is located on a side surface of a second layer according to various embodiments.

FIG. 9 is a cross-sectional view of an antenna module in which a magnetic material is located on a side surface of a second layer according to various embodiments.

The antenna module 900 according to an embodiment may include a first layer 910 in which a first antenna patch 970 and a second antenna 960 are disposed, a dielectric material 920, a second layer 930, a magnetic material 940, and a heat dissipation sheet 950. According to an embodiment (not illustrated), at least one of the above-described components (e.g., the heat dissipation sheet 950) of the antenna module 900 may be omitted or another component may be added. The same reference numerals are used for the same or substantially the same components as those described above, and redundant descriptions will be omitted.

The magnetic material 940 according to an embodiment may be disposed in an area corresponding to a position where the second antenna 960 in the first layer 910 is disposed.

The magnetic material 940 according to an embodiment may be disposed to surround the second layer 930 while overlapping the dielectric material 920. The magnetic material 940 may be disposed to surround the second layer 930 without being in contact with the dielectric material 920. For example, the magnetic material 940 may be disposed to surround the second layer 930, and the heat dissipation sheet 950 may be disposed under the second layer 930 and the magnetic material 940.

According to an embodiment, the magnetic material 940 may be disposed to surround the second layer 930 and the heat dissipation sheet 950 while being in contact with the dielectric material 920. The magnetic material 940 may be disposed to surround the second layer 930 and the heat dissipation sheet 950 without coming into contact with the dielectric material 920. For example, the heat dissipation sheet 950 may be disposed to be in contact with the second layer 930 on the top surface thereof and to be surrounded by the magnetic material 940 on the side surface thereof.

Figure 10:
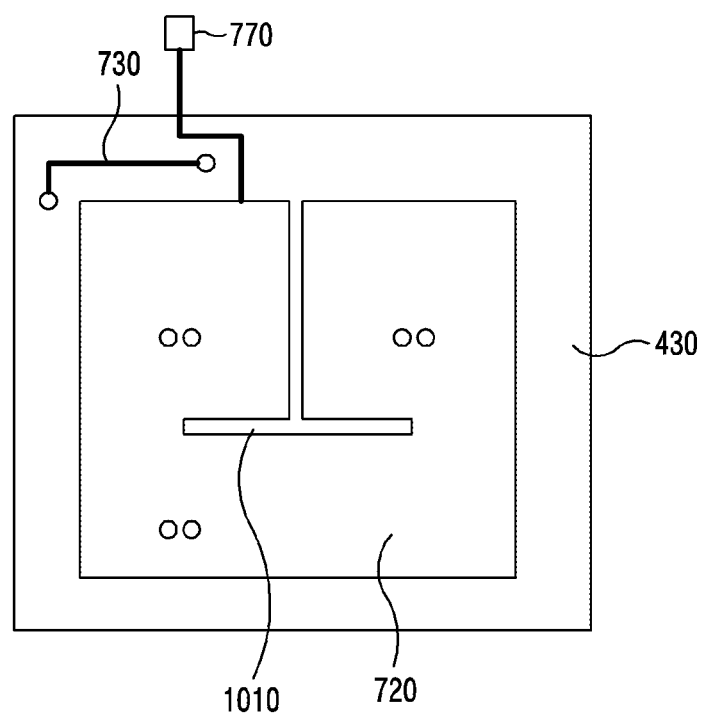
FIG. 10 is a diagram illustrating a first pattern including a slit therein according to various embodiments.

FIG. 10 is a diagram illustrating a first pattern including a slit therein according to an embodiment.

Referring to FIG. 10, a second layer 430 according to an embodiment may include a first pattern 720, a second pattern 730, and a slit 1010 disposed inside the first pattern 720. The same reference numerals are used for the same or substantially the same components as those described above, and redundant descriptions will be omitted.

The first pattern 720 according to an embodiment may include a non-conductive slit 1010 therein. One end of the slit 1010 according to an embodiment may be connected to a portion of the periphery of the first pattern 720. One end of the slit 1010 may be connected to a portion of the periphery of the first pattern 720, and the other end may be disposed at the center of the first pattern 720. For example, the slit 1010 may have a T-shape, and one end of the slit 1010 may be connected to a portion of the periphery of the first pattern 720. However, the shape of the slit 1010 is not limited thereto.

According to an embodiment, by disposing the slit 1010 included in the first pattern 720, it is possible to prevent and/or reduce performance degradation of the first antenna 320 by suppressing an eddy current.

Figure 11:
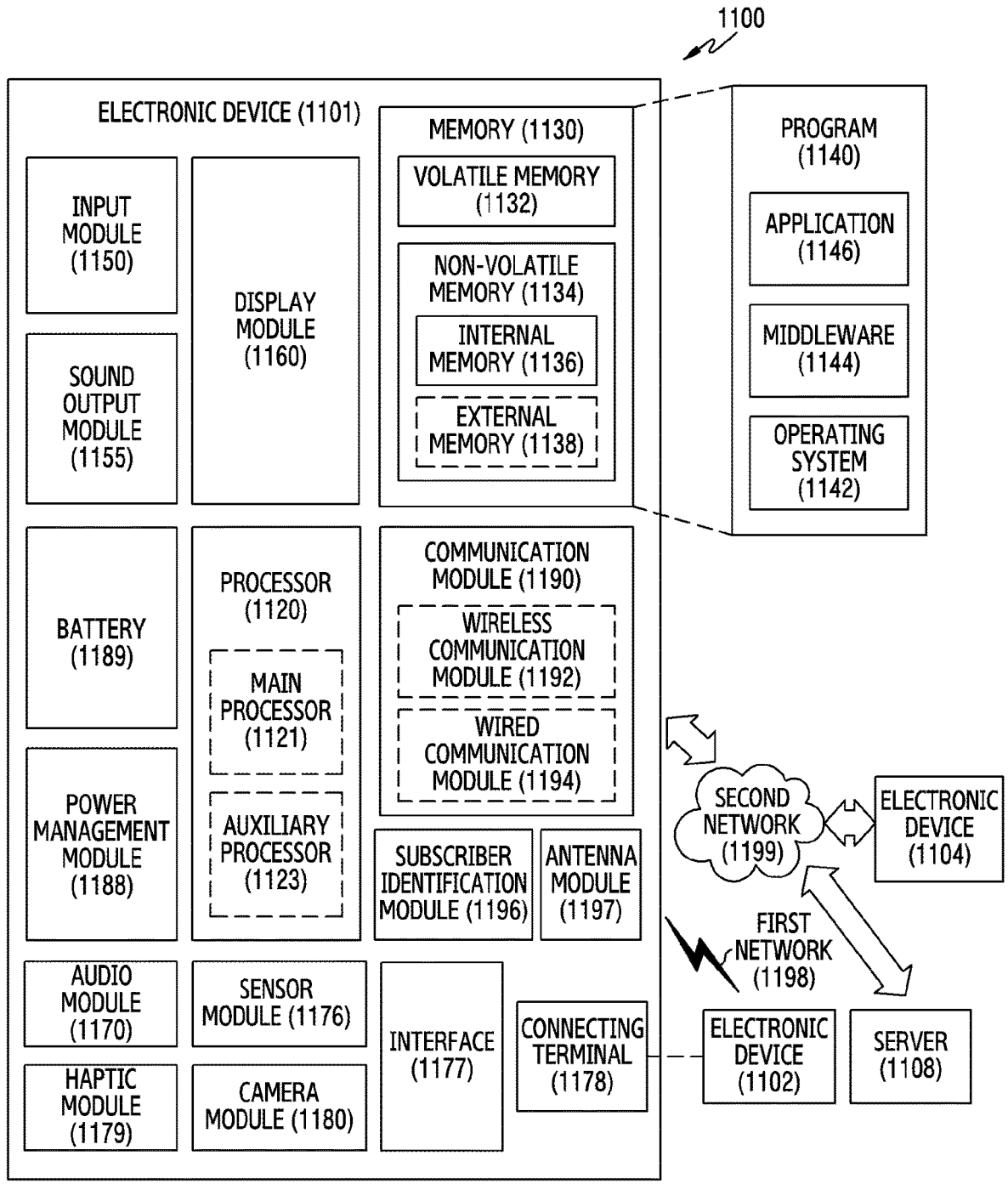
FIG. 11 is a block diagram illustrating an example electronic device in a network environment according to various embodiments.

FIG. 11 is a block diagram illustrating an example electronic device in a network environment according to various embodiments.

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In various embodiments, at least one of the components (e.g., the connecting terminal 1178) may be omitted from the electronic device 1101, or one or more other components may be added in the electronic device 1101. In various embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images.

According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™ wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element including a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In an embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an example embodiment, the electronic device may include: a first layer including a first antenna having a patch shape, and a second antenna at least partially surrounding the first antenna and having a coil shape, a second layer including a first pattern disposed at a position corresponding to the first antenna and configured to operate as a ground of the first antenna, and a second pattern electrically connected to the second antenna, a dielectric material disposed between the first layer and the second layer, and a magnetic material disposed under the dielectric at a position corresponding to the second antenna.

According to an example embodiment, the electronic device may include at least one wireless communication circuit electrically connected to the first antenna and the second antenna.

According to an example embodiment, the at least one wireless communication circuit may be configured to transmit and/or receive an ultra-wide band (UWB) signal via the first antenna.

According to an example embodiment, the at least one wireless communication circuit may be configured to transmit and/or receive a near-field communication (NFC) signal via the second antenna.

According to an example embodiment, the electronic device may further include a battery electrically connected to the second antenna, and the wireless communication circuit may be configured to charge the battery using an induced current generated by the second antenna.

According to an example embodiment, in the electronic device, the first antenna of the first layer may be electrically connected to the first pattern of the second layer via a conductive via penetrating the dielectric material.

According to an example embodiment, the electronic device may include a printed circuit board, and the first antenna and the second antenna may be connected to the printed circuit board via a connector.

According to an example embodiment, the second antenna of the first layer may be electrically connected to the second pattern of the second layer via a conductive via penetrating the dielectric material.

According to an example embodiment, the magnetic material may be disposed below the second layer.

According to an example embodiment, the magnetic material may be disposed to surround the second layer while being in contact with the dielectric.

According to an example embodiment, the magnetic material may include a ferrite sheet.

According to an example embodiment, the first antenna and the second antenna may be disposed to be spaced apart from each other.

According to an example embodiment, the electronic device may include a graphite sheet disposed under the magnetic material.

According to an example embodiment, the electronic device may include a graphite sheet disposed below the magnetic material and the second layer.

According to an example embodiment, the first pattern may further include a slit.

An electronic device according to an example embodiment may include: a housing including an accommodation space in which electronic components are disposed, wherein the housing includes a first accommodation space, a first coil antenna in an area other than the first accommodation space inside the housing, and an antenna module comprising at least one antenna disposed in the first accommodation space. The antenna module may include: a first layer including a first antenna having a patch shape, and a second antenna at least partially surrounding the first antenna and having a coil shape, a second layer including a first pattern disposed at a position corresponding to the first antenna and configured to operate as a ground of the first antenna, and a second pattern electrically connected to the second antenna, a dielectric material disposed between the first layer and the second layer, and a magnetic material disposed at a position of the second antenna under the dielectric material.

According to an example embodiment, the antenna module may be electrically connected to the first coil antenna.

According to an example embodiment, the electronic device may further include a magnetic secure transfer (MST) control circuit, and the MST control circuit may be configured to transmit an MST signal for payment using the first coil antenna.

According to an example embodiment, the electronic device may further include a power management circuit, and the power management circuit may be configured to wirelessly charge power using the first coil antenna.

According to an example embodiment, the electronic device may include at least one wireless communication circuit electrically connected to the first coil antenna and the antenna module.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first layer comprising a first antenna comprising a patch shape, and a second antenna surrounding the first antenna and comprising a coil shape;
   a second layer comprising a first pattern disposed at a position corresponding to the first antenna and configured to operate as a ground of the first antenna, and a second pattern electrically connected to the second antenna;
   a dielectric material disposed between at least the first layer and the second layer; and
   a magnetic material disposed under at least the dielectric material at a position corresponding to the second antenna,
   wherein the first pattern is connected to the first antenna via at least one first conductive via, and
   wherein the second pattern is connected to the second antenna via at least one second conductive via, and spaced apart from the first pattern in the second layer.

2. The electronic device of claim 1, further comprising at least one wireless communication circuit electrically connected to the first antenna and the second antenna.

3. The electronic device of claim 2, wherein the at least one wireless communication circuit is configured to transmit/receive an ultra-wide band (UWB) signal via the first antenna.

4. The electronic device of claim 2, wherein the at least one wireless communication circuit is configured to transmit/receive a near field communication (NFC) signal via the second antenna.

5. The electronic device of claim 2, further comprising a battery electrically connected to the second antenna,
wherein the at least one wireless communication circuit is configured to charge the battery using an induced current generated by the second antenna.

6. The electronic device of claim 1, wherein the first antenna of the first layer is electrically connected to the first pattern of the second layer via the at least one first conductive via penetrating the dielectric material.

7. The electronic device of claim 1, further comprising a printed circuit board,
wherein the first antenna and the second antenna are connected to the printed circuit board via a connector.

8. The electronic device of claim 1, wherein at least one point of the second antenna of the first layer is electrically connected to the second pattern of the second layer via the at least one second conductive via penetrating the dielectric material.

9. The electronic device of claim 1, wherein the magnetic material is disposed below the second layer.

10. The electronic device of claim 9, further comprising a graphite sheet disposed under the magnetic material.

11. The electronic device of claim 1, wherein the magnetic material is disposed to surround the second layer while being in contact with the dielectric material.

12. The electronic device of claim 11, further comprising a graphite sheet below the magnetic material and the second layer.

13. The electronic device of claim 1, wherein the magnetic material comprises a ferrite sheet.

14. The electronic device of claim 1, wherein the first antenna and the second antenna are spaced apart from each other.

15. The electronic device of claim 1, wherein the first pattern further comprises a slit.

16. An electronic device comprising:
a first layer comprising a first antenna comprising a patch shape, and a second antenna surrounding the first antenna and comprising a coil shape;
a second layer comprising a first pattern disposed at a position corresponding to the first antenna, connected to the first antenna via at least one first conductive via and configured to operate as a ground of the first antenna, and a second pattern electrically connected to the second antenna via at least one second conductive via;
a dielectric material disposed between at least the first layer and the second layer; and
a magnetic material disposed under at least the dielectric material at a position corresponding to the second antenna,
wherein the second antenna comprises a first point and a second point connected to the second pattern via the second layer and through the dielectric material to form the coil shape.

* * * * *